Jan. 2, 1951  C. D. TRIPP  2,536,110
MACHINE FOR MAKING LOCK NUTS
Filed Dec. 16, 1944  10 Sheets-Sheet 5

INVENTOR.
CHESTER D. TRIPP
BY
Strauch & Hoffman
Attorneys

Jan. 2, 1951 C. D. TRIPP 2,536,110
MACHINE FOR MAKING LOCK NUTS
Filed Dec. 16, 1944 10 Sheets-Sheet 6

INVENTOR.
CHESTER D. TRIPP
BY
Strauch & Hoffman
Attorneys

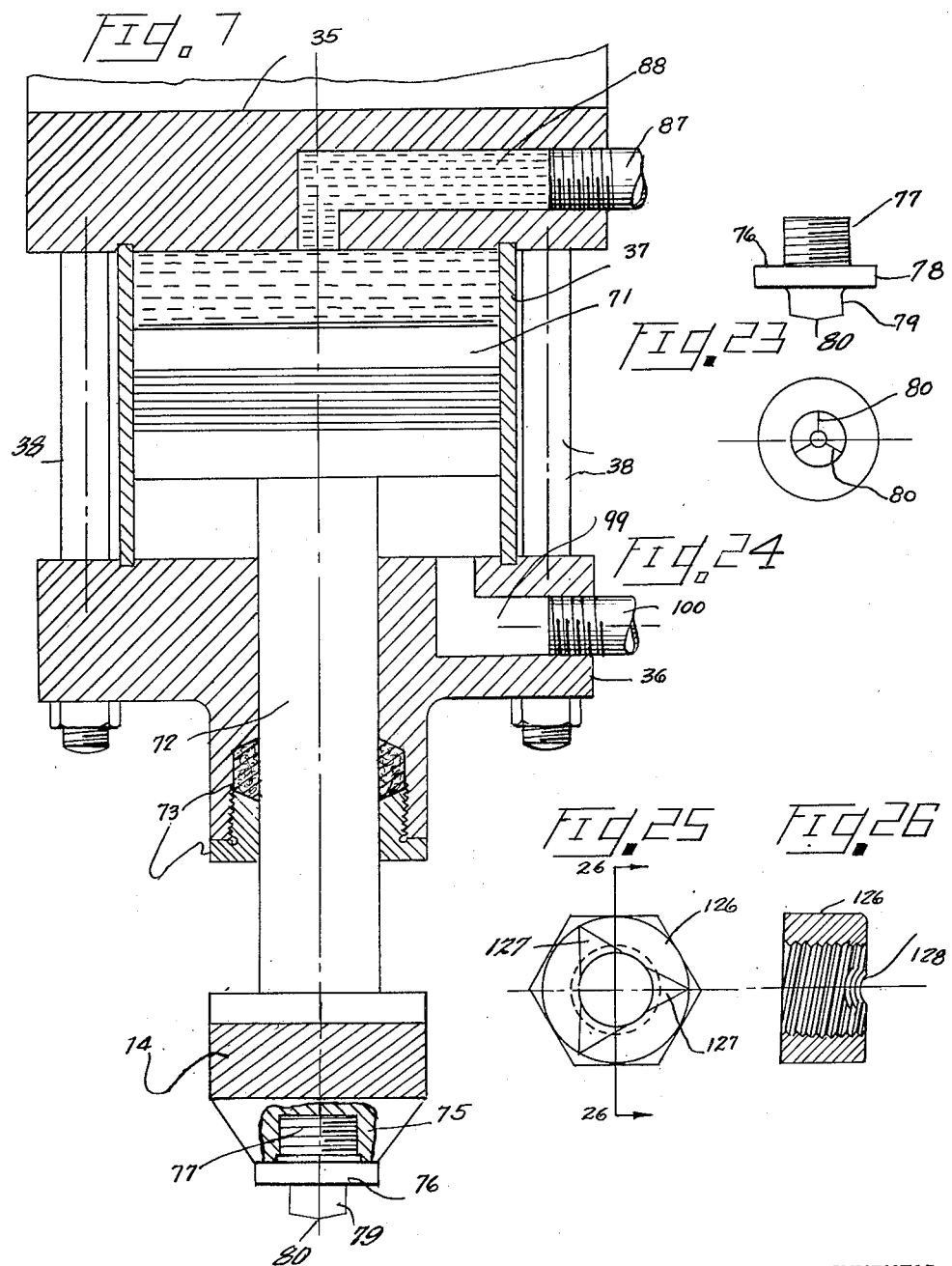

Jan. 2, 1951 C. D. TRIPP 2,536,110
MACHINE FOR MAKING LOCK NUTS
Filed Dec. 16, 1944 10 Sheets-Sheet 8
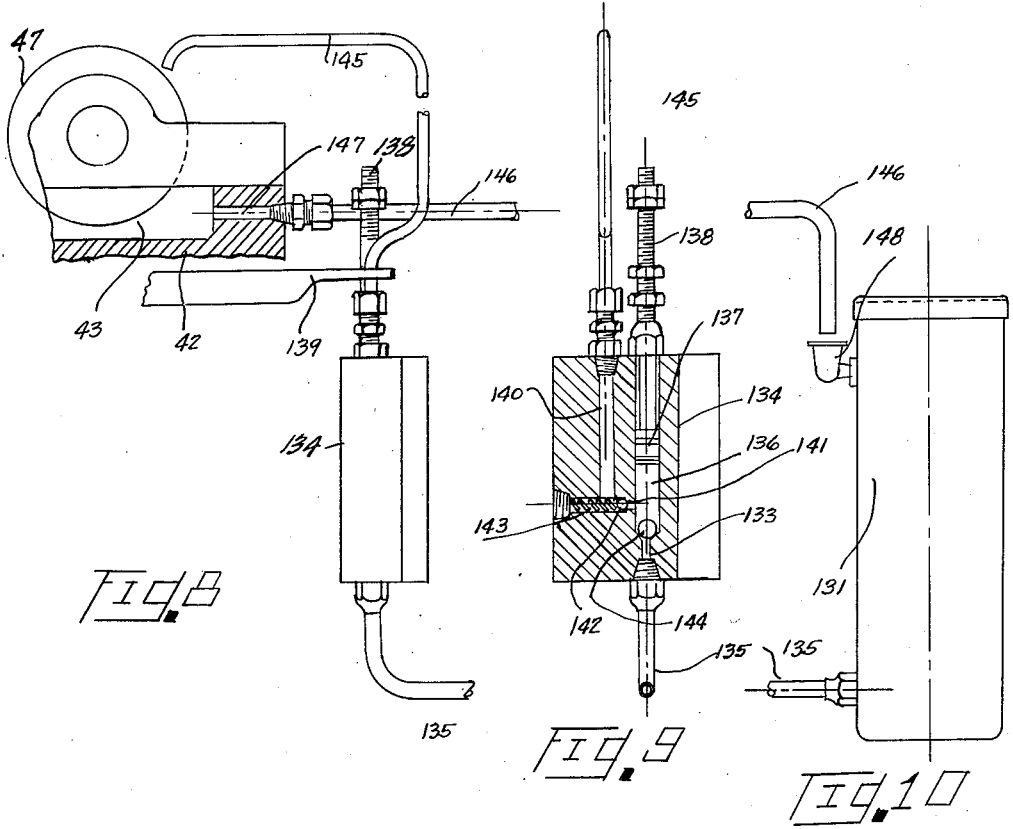
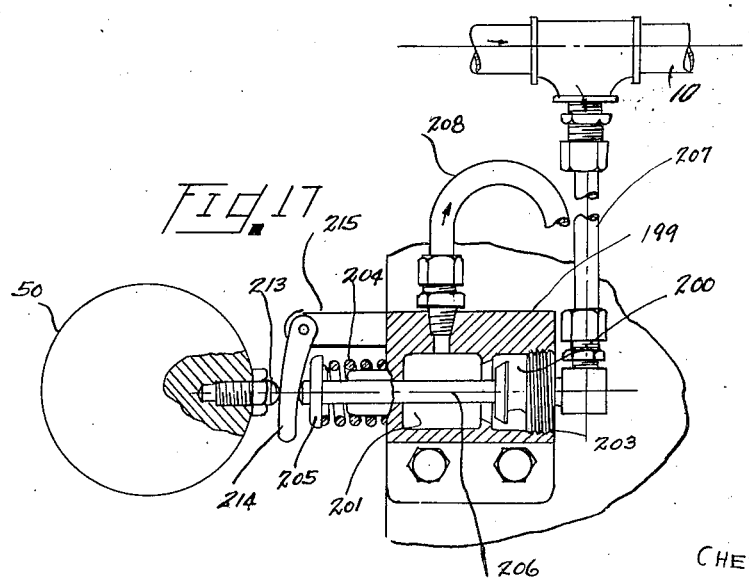
INVENTOR.
CHESTER D. TRIPP
BY
Strauch & Hoffman
Attorneys Jan. 2, 1951 C. D. TRIPP 2,536,110
MACHINE FOR MAKING LOCK NUTS
Filed Dec. 16, 1944 10 Sheets-Sheet 9
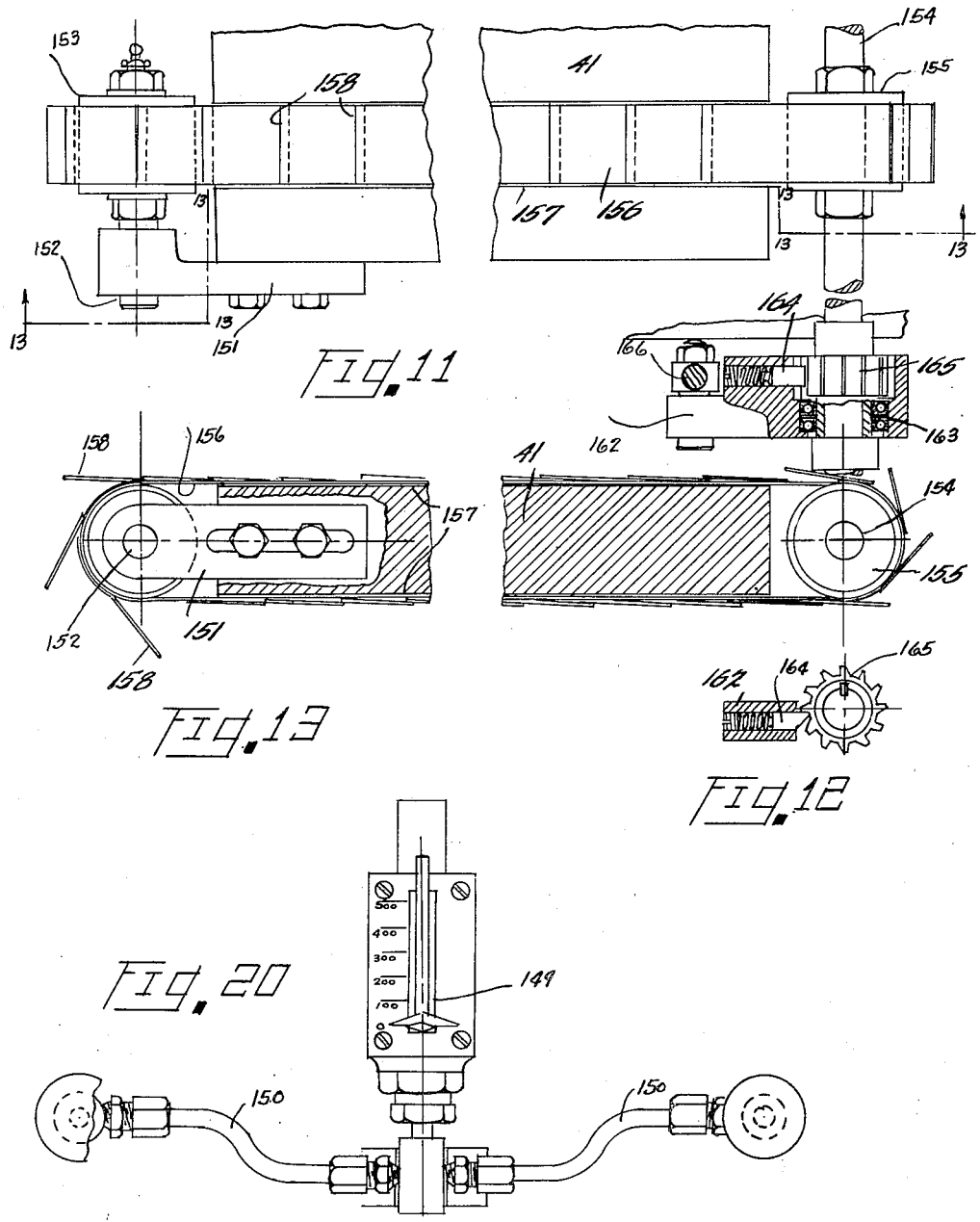
INVENTOR.
CHESTER D. TRIPP
BY
Strauch & Hoffman
Attorneys Jan. 2, 1951          C. D. TRIPP          2,536,110
MACHINE FOR MAKING LOCK NUTS
Filed Dec. 16, 1944          10 Sheets-Sheet 10
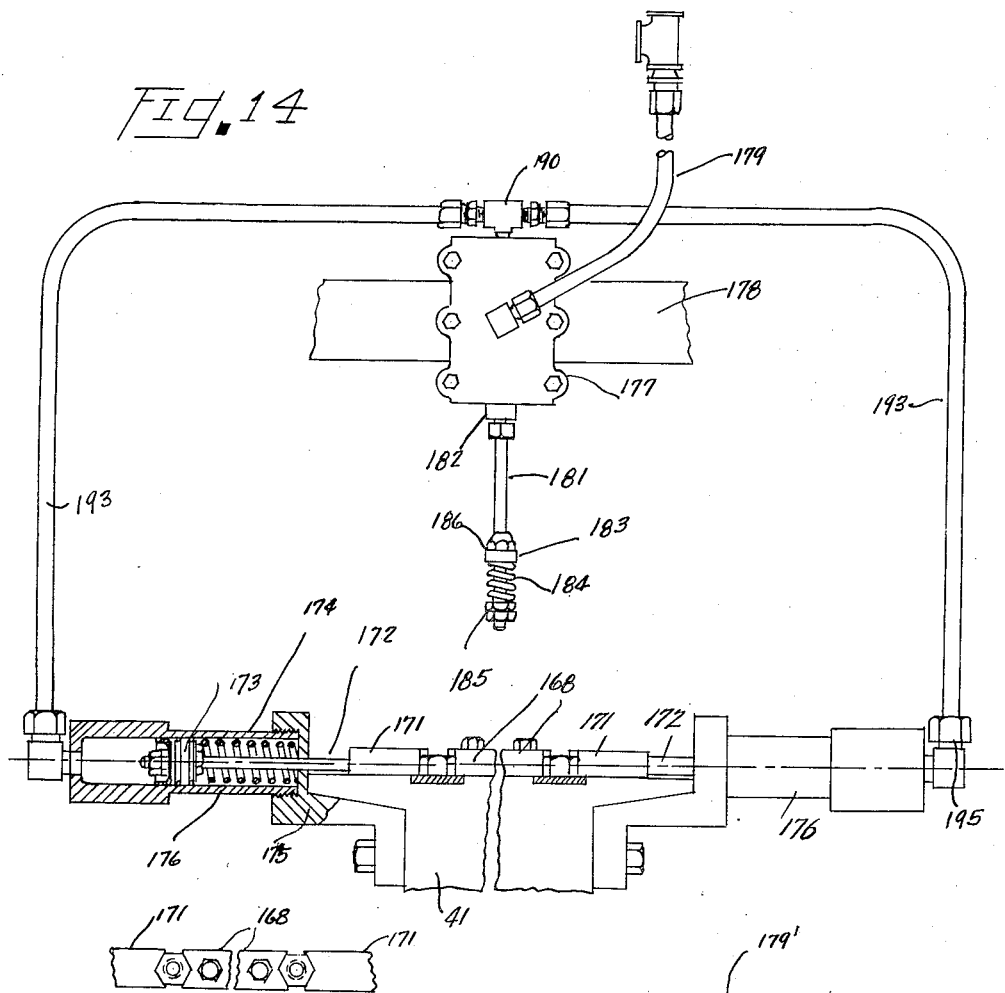
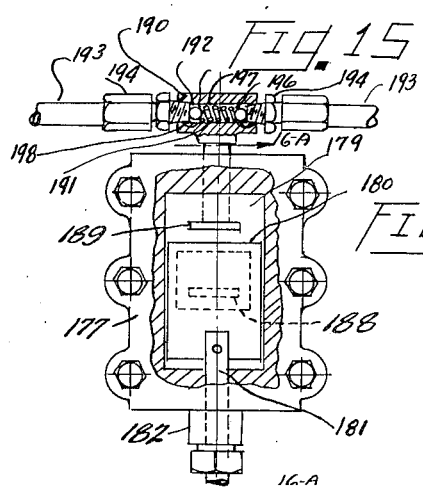
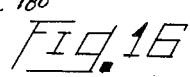
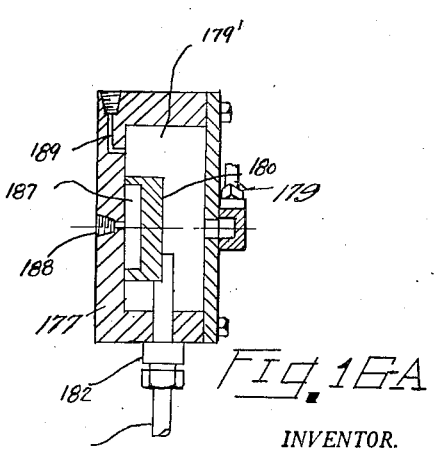
INVENTOR.
CHESTER D. TRIPP
BY
Strauch & Hoffman
Attorneys Patented Jan. 2, 1951

2,536,110

UNITED STATES PATENT OFFICE 2,536,110

MACHINE FOR MAKING LOCK NUTS

Chester D. Tripp, Chicago, Ill., assignor to Grip Nut Company, South Whitley, Ind., a corporation of Illinois Application December 16, 1944, Serial No. 568,501

16 Claims. (Cl. 10—86)

The present invention relates to an improved method and machine for making lock nuts and more particularly to a machine for converting standard commercial nuts into lock nuts having a predetermined locking or gripping force.

While the machine disclosed and claimed in my copending application Serial No. 517,409, filed January 7, 1944, now Patent No. 2,408,457, issued October 1, 1946, provides a wholly satisfactory machine for converting standard commercial nuts into lock nuts, the machine in that application necessitates the reciprocation of a nut supporting table, nut feeding mechanism and other relatively heavy machine parts. Furthermore, it has been found that the predetermined characteristics of the machine of the above-mentioned application can be substantially improved by the provision of means for predetermining the initial pressing force exerted on the nut and allowing the pressing force to build up to a predetermined higher value as the pressing of the nut continues. In this way extremely accurate control of the gripping characteristics is obtained, since the indenting force can never exceed the predetermined value notwithstanding inaccuracies which might be built into the machine.

It, accordingly, is a major object of this invention to provide a novel apparatus embodying certain improvements in the method of my Patent No. 2,352,668, issued July 4, 1944, and to provide other improvements and refinements in lock nut making apparatus, as will hereinafter appear.

Another important object of the invention is to provide a machine for making lock nuts, using a fluid pressure actuated indenting tool of rapidly increasing contact area, which embodies means for initially subjecting a nut to a predetermined minimum indenting pressure, then progressively increasing the indenting pressure to a predetermined maximum value, thereby wholly compensating for structural inaccuracies in the machine and making possible the production of effective lock nuts having substantially more uniform locking characteristics than formerly, irrespective of varations in the axial dimension and density of the nuts.

It is also an object of the invention to provide a nut deforming machine having novel nut gripping means adapted to retain the nut in position while deforming it.

A further object of the invention resides in the provision of a lock nut making or indenting machine having novel means for predetermining and limiting the effective stroke of the indenting dies to assure uniform values of the locking characteristics in successive nuts, irrespective of the axial dimension and density of the nuts.

Still another object of the present invention is to provide a lock nut making or indenting machine with a stationary nut supporting table and reciprocating indenting mechanism having a substantially constant length of stroke and means for controlling the effective indenting movements of the indenting dies independently of the means for reciprocating the indenting mechanism.

The invention also has for one of its important objects to provide novel hydro-pneumatically actuated mechanism for controlling the operation of the nut indenting dies.

A further object of the present invention resides in the provision of novel means for reciprocating the dies and pressure applying assembly, together with a novel lubrication system therefor.

It is also a still further object of my invention to provide simply constructed and positively operating nut feeding and gripping means together with means for automatically discharging the finished lock nuts from the machine.

The present invention further comprehends the provision of a simple and efficiently operating means for automatically controlling the operation of nut gripping and nut discharging mechanisms in timed relation to the reciprocating movements of the nut indenting die assembly.

With the foregoing and other subordinate objects in view, the present invention comprises the improved machine for making lock nuts, and the construction and relative arrangement of its several parts, as will be hereinafter more fully described, illustrated in the accompanying drawings and subsequently incorporated in the subjoined claims.

In the drawings wherein similar reference characters designate corresponding parts throughout the several views:

Figure 7 is a detailed sectional view of one of the die actuating units;

Figure 8 is a detailed elevation partially in section, illustrating the lubricating system for the die reciprocating mechanism;

Figure 9 is a detailed sectional view of the lubricant distributing pump;

Figure 10 is a detailed elevation of the suction delivery oil tank;

Figure 11 is a top plan view of the nut feed conveyor with certain parts shown in section to illustrate the step by step conveyor actuating mechanism;

Figure 12 is a fragmentary view showing the pawl and ratchet conveyor actuating mechanism illustrated in Figure 11;

Figure 13 is a sectional view taken substantially on the line 13—13 of Figure 11;

Figure 14 is a schematic elevation with parts shown in section to illustrate the nut gripping mechanism and fluid supply pipe connections for operating the movable nut gripping elements;

Figure 15 is a fragmentary plan view illustrating the manner in which the gripping elements grip the nuts during the indenting operation of the machine;

Figure 16 is a sectional view of the valve mechanism illustrated in Figure 14;

Figures 21, 22:
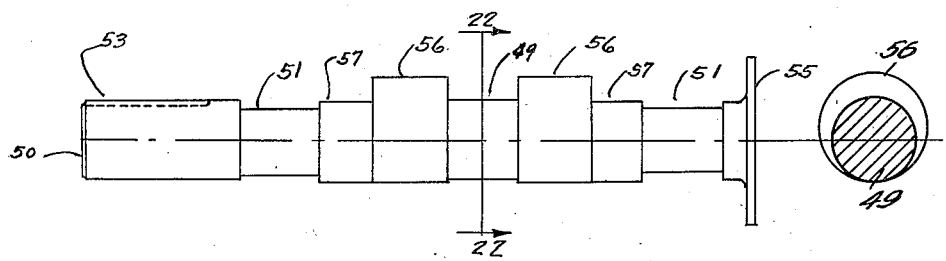

Figure 16—A is a vertical sectional view taken substantially on the line a—a of Figure 16;

Figure 17 is a schematic view with certain parts shown in section, illustrating the air supply valve for the nut discharging means together with the operating means therefor;

Figure 18 is an enlarged sectional view of the air inlet pressure regulator;

Figure 19 is an enlarged sectional view of the outlet liquid pressure regulator through which the liquid is returned from the die operating piston cylinders to the tank or reservoir;

Figure 20 is an enlarged elevational view of the liquid level indicator and equalizing means;

Figure 21 is a detailed elevation of the drive shaft for operating the piston and cylinder assemblies;

Figure 22 is a transverse section taken substantially on the line 22—22 of Figure 21.

Figure 23 is a detailed elevation of a preferred form of nut indenting die;

Figure 24 is a bottom plan view of the die shown in Figure 23;

Figure 25 is a plan view of one form of nut after it has been deformed by the die shown in Figure 23; and Figure 26 is a sectional view of the deformed nut taken substantially on the line 26—26 of Figure 25.

Referring in further detail to the drawings, in the embodiment of the invention which I have selected for purposes of illustration, the supporting superstructure for the several mechanisms to be presently described in detail is suitably mounted upon the bed plate 30, having its opposite ends fixed upon the upper ends of the floor pedestals or standards 31. As herein shown this superstructure includes the vertical side members 32 connected at their upper ends by the cross bar 33, the opposite ends of which are connected with the forward end of the bed plate 30 by the diagonal brace rods 34.

Between the spaced side members 32 of the machine frame the die operating piston and cylinder assemblies are mounted for vertical reciprocation. As herein shown, and seen more clearly in Figure 7 of the drawings, each of these assemblies includes upper and lower heads 35 and 36 respectively, between which the ends of the cylinder 37 are rigidly clamped in fluid tight connection by means of a plurality of tie rods 38. The lower piston heads 36 at the front and rear sides thereof are rigidly connected by the apertured plates 39 which have vertical sliding movement upon front and rear rods 40 suitably fixed at their lower ends in the plate 41 mounted upon the central portion of the bed 30 of the machine.

The upper cylinder heads 35 are also connected by the hollow cross bar 42, formed in the upper position thereof with a longitudinally extending lubricant receiving channel 43. At its opposite ends transverse bearing members 44 are fixed to the bar 42 and a similar bearing member 45 is centrally fixed thereto. In these bearing members a rod or shaft 46 is suitably fixed. At each side of the bearing member 45, a roller 47 is loosely mounted to freely rotate upon the rod 46.

To the frame member 33 a depending bearing bracket 48 is centrally secured, said bracket at the rear side thereof having a detachable cap section and providing a supporting bearing for the central portion 49 of the drive shaft 50, illustrated in detail in Figures 21 and 22 of the drawings.

Figure 1:
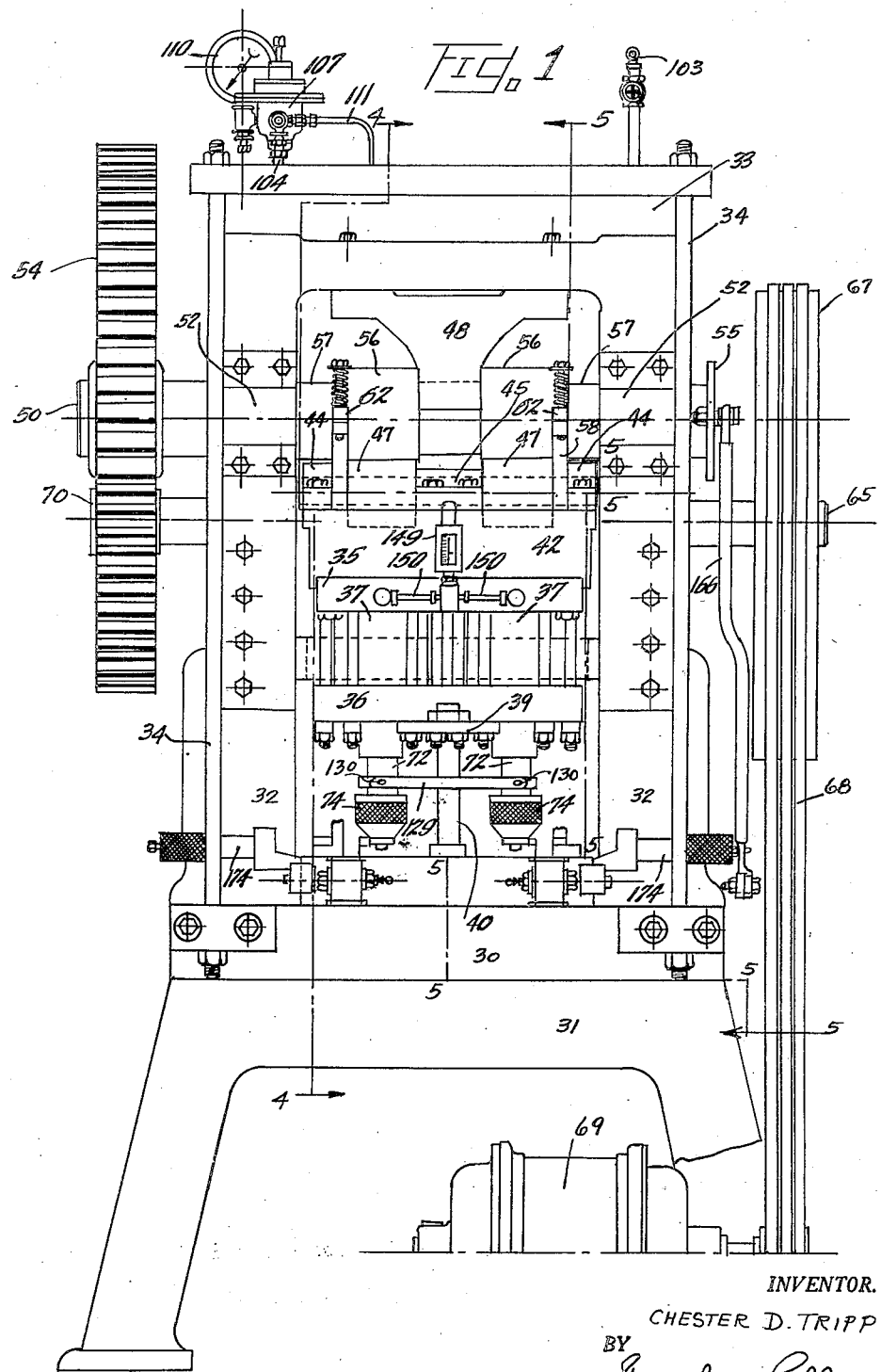
Figure 1 is a front elevational view of a machine illustrating one practical embodiment of the present invention, certain of the parts being omitted to more clearly disclose the novel features thereof.

The similar end portions 51 of the drive shaft are journalled in suitable bearings, indicated at 52 in Figure 1, on the front edge faces of the frame members 32. The drive shaft has one terminal portion 53 projecting laterally from one side of the machine frame and keyed or otherwise suitably fixed in the hub of a large gear wheel 54. At the opposite side of the machine frame the other end of the drive shaft 50 terminates in the flange or disk 55 of enlarged diameter, for a purpose which will be presently explained.

At each side of its central portion 49, the drive shaft is formed with an eccentric portion 56 which, respectively, have peripheral bearing contact upon the spaced rollers 47 on the rod 46. Between these eccentric portions 56 of the shaft and the bearing supported parts 51 thereof, the shaft is formed with the cylindrical portions 57, concentric with the shaft axis and of slightly greater diameter than the parts 51.

Figure 4:
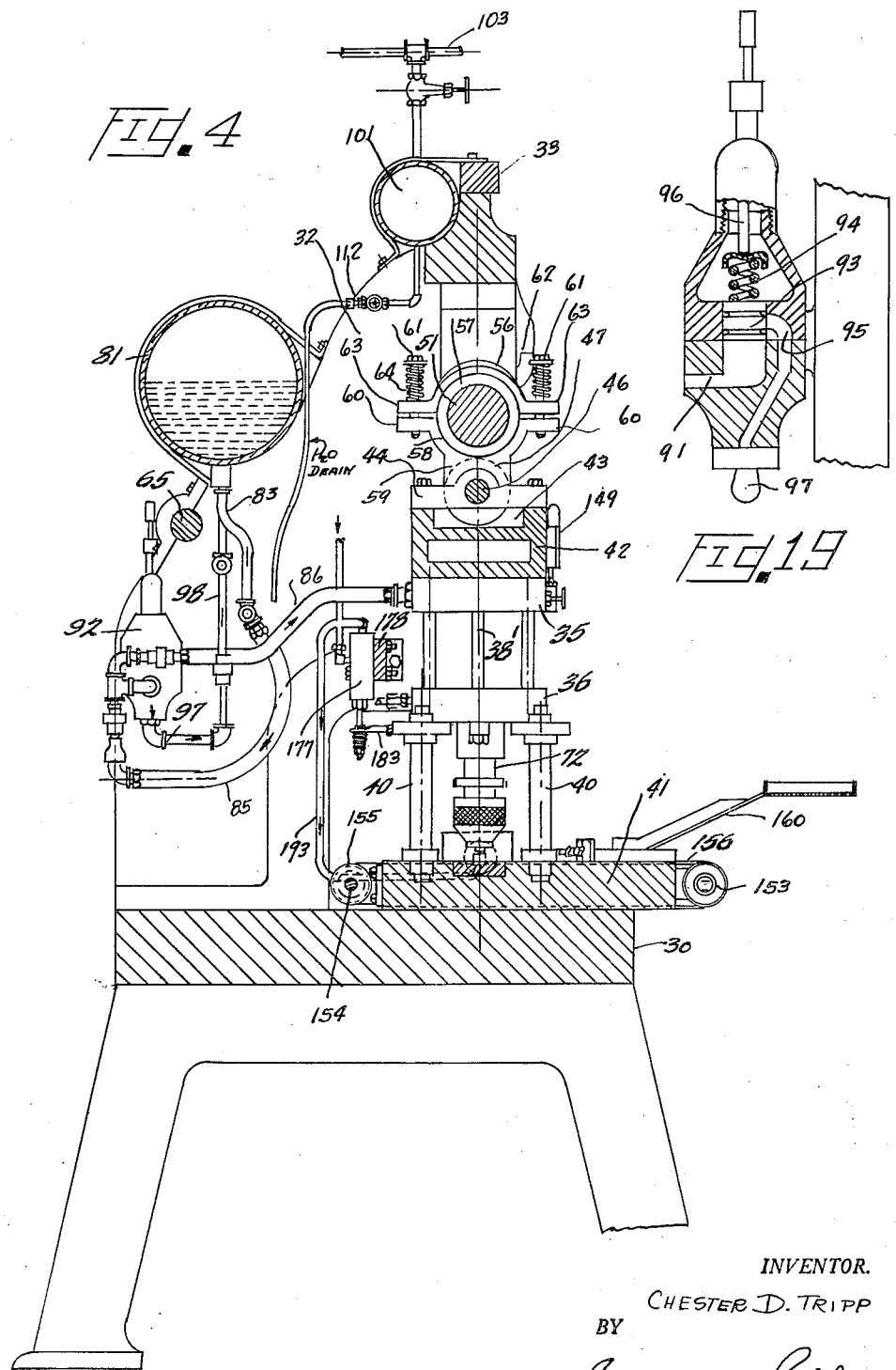
Figure 4 is a vertical sectional view taken substantially on the line 4—4 of Figure 1.

With each of the shaft portions 57, the upper and lower sections of a yoke illustrated in Figure 4 are engaged at the outer sides of the adjacent eccentric portion 56 of the shaft. Each lower yoke section 58 has a depending part 59 which is fixed to the rod 46 and at its upper end is formed with forwardly and rearwardly projecting apertured ears 60 in which the lower ends of vertical rods 61 are suitably fixed. The upper yoke section 62 has similar apertured ears 63 through which the rods 61 loosely extend, and springs 64 on said rods act to normally yieldingly urge the two yoke sections toward each other and hold the same yieldingly in contact with the peripheral surface of one of the shaft sections 57.

Any convenient means may be employed for transmitting power through the gear 54 to the shaft 50, but as herein shown, for this purpose, I provide the countershaft 65 mounted in suitable bearings 66 on the rear vertical edges of the frame members 32. A belt wheel 67 is fixed to one end of said shaft and connected by drive belt 68 with the shaft of the motor 69 shown in Figure 1. To the other end of the shaft 65, a spur gear 70 of relatively small diameter is affixed and is in constant mesh with the teeth of the large gear wheel 54. Thus it will be understood that shaft 50 is driven at a comparatively low speed.

A reciprocatory piston 71 in each of the cylinders 37 is fixed to the upper end of a piston rod 72 movable through the stuffing box 73 on the lower cylinder head 36. A die holding head 74 is detachably carried by the lower end of the rod 72 and has a threaded bore 75 to receive the threaded stud or shank 77 of the die member 76. As shown in Figures 23 and 24 of the drawings, this indenting member has a flange 78 for abutting contact with the end face of the head 74 and from which the indenting stud 79 axially projects. The end face of this stud is formed with three shallow indenting teeth, the crests 80 of which are spaced apart for substantially 120°. The effective operation of this indenting die upon the nut to provide the latter with locking characteristics will be subsequently explained.

Upon the rear edges of frame members 32 and above the shaft 65, a transversely positioned tank 81 is secured at its opposite ends by any suitable means, such as the metal straps 82. A predetermined quantity of water, oil or other liquid is supplied to this tank from a pump or other convenient source.

To the bottom of the tank 81, at the approximate center thereof, the upper end of a pipe 83 is connected and the lower end of this pipe is connected by coupling means 84 with the branch pipes 85. These pipes are connected by suitable coupling means with one end of the flexible pipes 86, the other ends of which are connected with pipe nipples 87 threaded into the outer ends of the passages 88 in the upper cylinder heads 35 through which the liquid is supplied from the tank 81 to the respective piston cylinders 57. The connection between the pipes 85 and 86 includes a conventional ball check valve, indicated at 89, to prevent back flow of the liquid through the pipes 85, and the T coupling members 90 which are connected with the return inlet ports 91 of the return flow pressure regulating valves, indicated generally at 92, and shown in detail in Figure 19 of the drawings. Referring thereto, the valve piston 93 is normally urged downwardly by spring 94 to close the connection between the inlet port 91 and the outlet port 95. The pressure force necessary to lift the valves 93 and open the connections between the inlet ports 91 and outlet ports 95 may be regulated and predetermined by the adjustment of the rod or stem 96 with relation to the spring 94. The lower ends of the outlet ports 95 are connected by the pipe lines 97 with the pipe 98 connected with one end of the tank 81.

As shown in Figure 7 of the drawing, the lower cylinder heads 36 are also provided with outlet passages 99 for liquid leaking past the pistons 71 with which pipes 100 are connected to return such liquid to the pump cylinder or other source of supply for the tank 81.

Figure 3:
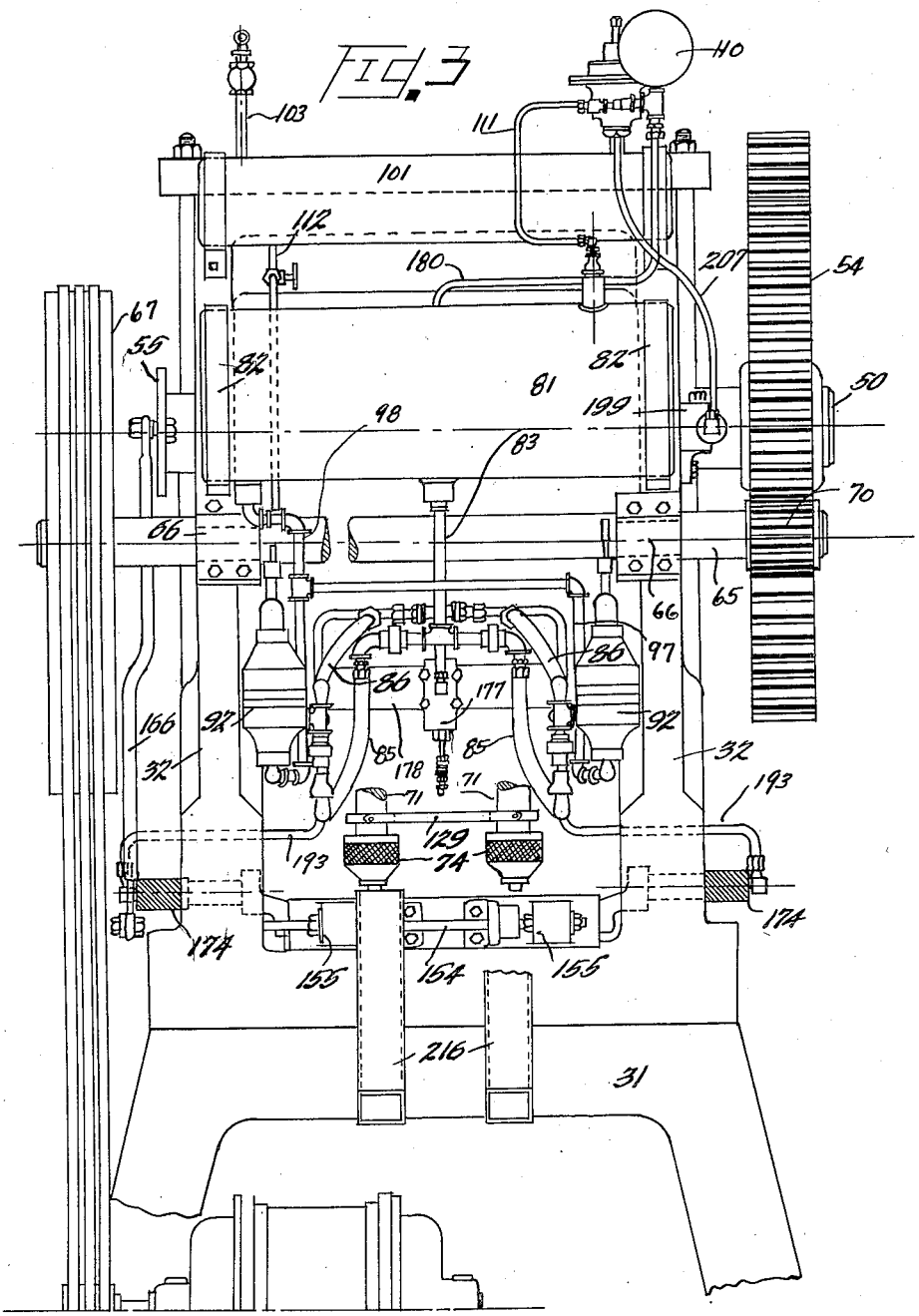
Figure 3 is a rear elevation of the machine, certain parts being omitted in the interest of greater clarity.

Upon the frame members 32 and above the tank 81, a small diameter moisture separating tank 101 is secured by means of the clamps 102 to one end of which air is supplied through the pipe line 103. At the other end of said tank, the outlet 104 is connected by the coupling 105 with the air inlet pipe 106 of the pressure regulator 107 shown in detail in Figure 18 of the drawings. Preferably the coupling 105 is of T form for the connection therewith of the pipe 108 through which air may be supplied to other apparatus in the plant. The outlet side of the pressure regulator 107 is connected by pipe 109 with the pressure gauge 110 coupled with the pipe 111 connected to the top of the tank 81 as most clearly shown in Figures 3 and 5 of the drawings. A valved drain pipe 112 is connected to the bottom of the tank 101 as seen in Figure 4.

While any preferred type of pressure regulating valve 107 may be employed, as herein shown this valve includes a diaphragm 113 having its marginal portion secured between the upper and lower sections 114 and 115 respectively, of the valve casing. The lower section 115 has an axial bore 116 provided with a section 117 of reduced diameter with which the pipe 106 communicates. A valve member 118 normally closes communication between the bore 116 and the chamber 119 of large diameter at the lower side of diaphragm 113. This chamber is connected with the outlet pipe 109 by the port 120. A light coil spring 121 bearing at its outer end against the closure plug 122 yieldingly urges the valve member 118 to closed position with the upper end of said valve member in contact with the lower face of the diaphragm 113. Upward movement of the diaphragm is yieldingly resisted by coil spring 123, such resistance being regulated by adjusting screw 124 threaded in the casing section 114 and locked in adjusted position by a nut 125.

As thus far described, the operation of the machine is as follows: With the pistons 71 in their lower positions a predetermined volume of liquid is supplied to the tank 81 to completely fill the cylinders 37 above the pistons and the connections between the same and the tank 81 until said tank is substantially about one-half filled with the liquid. Air is admitted to the tank above the level of the liquid through the valve 107 to establish a predetermined pressure as shown by the gauge 110. The valve 118 is then closed and the spring 123 properly adjusted until the pressure on the upper side of diaphragm 113 substantially balances back pressure in chamber 119 from the tank 81.

Assuming that two standard nuts have been positioned upon the upper surface of plate 41 in axial alignment with the respective indenting dies 76, in the rotation of drive shaft 50, the cylinders 37 and pistons 31 are moved downwardly as a unit by the thrust of the eccentric shaft portions 56 against the rollers 47, the lower yoke sections 58 being thrust downwardly relative to shaft sections 57 against the resistance of the springs 64. When the crests 80 of the lugs 79 of the die members contact the upper surfaces of the respective nuts at the edge of the bore therein, the pistons 71 are forced upwardly in the cylinders 37 against the resistance of the liquid and the air pressure thereon within the tank 81, resulting in a progressively increasing pressure of the respective die members upon the nuts. If the nuts happen to be of different axial lengths, the dies will of course contact the respective nuts at different times. Nevertheless the length of stroke of the pistons 71 will be the same. However, since the indenting pressure is derived solely from the hydro-pneumatically operated piston and as the impression surfaces of lugs 79 have a rapidly increasing area of contact compared to their axial dimension as pointed out in said Patent 2,352,668, the indenting pressure will be balanced by the resistance of the nut metal to lateral displacement and the effective length of stroke of pistons 71 will be the same irrespective of nut height. Consequently, identical distortions will be provided in successive nuts of the same composition irrespective of variations in height.

If the density of the nuts varies slightly, as may be the case in nuts of the same production run, the balance between the indenting pressure and the lateral resistance to displacement of the nut metal in different nuts may be reached after slightly different intervals of contact between the die and nut. However, this difference is negligible in its effect on the extent of distortion of the threads of successive nuts due to the rapid increase in the area of contact between the die and nut and the accurate control of the indenting pressure. As a consequence, all nuts of substantially identical composition will receive substantially identical distortions irrespective of variations in height and minor differences in density.

As seen in Figures 23 and 24 of the drawings, the indenting teeth of the lug 79 are of rapidly increasing surface area from the center of the lug to its periphery. Thus as seen in Figure 25, the nut 126 has formed in its end face three triangular indentations 127, the bases thereof being located on the bore of the nut and the opposite sides of each indentation being substantially tangential with respect to the nut bore. As seen in Figure 26 at three equidistantly spaced points, the nut threads are distorted as at 128 to provide the desired locking characteristics when the nut is threaded upon a complementary threaded element. For the reasons above stated such distortion of the nut threads, and therefore the locking characteristics of the nuts, will be uniform, regardless of variation in the axial length or density of different nuts.

Figure 5:
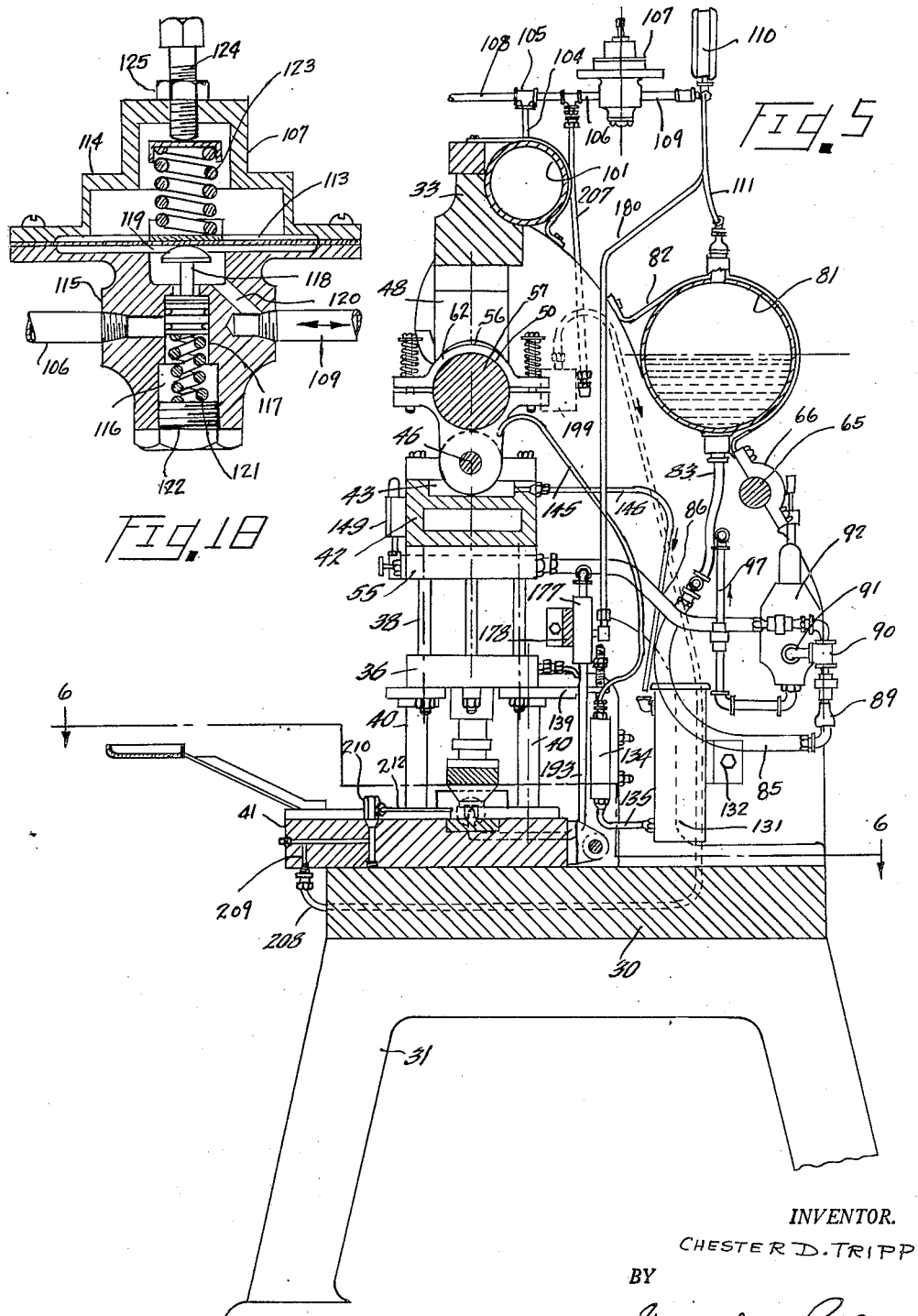
Figure 5 is a similar sectional view taken substantially on the line 5—5 of Figure 1.

Preferably, in order to insure a straight line vertical reciprocating motion of the dies and the piston and cylinder assemblies and to obviate frictional resistance by angular movement of the lower cylinder head relative to guide rods 40, I provide a simple and effective lubricating system for the drive shaft eccentrics 56 and the connecting yokes between said assemblies and the shaft portions 57. In order to prevent relative displacement of the die members 76 out of exact parallelism with each other while permitting relative axial movement thereof, I preferably connect the piston rods 72 at their lower ends by means of the link members 129, pivoted at their opposite ends to the respective piston rods, as at 130. The lubricating system just referred to will now be described as follows:

With more particular reference to Figures 5, 8 and 9 of the drawings, an oil supply tank 131 is supported by the fixed bracket 132 on the machine frame and with the lower end of this tank the inlet 133 of an oil pump 134 is connected by the pipe line 135. This inlet communicates with the lower end of the vertical bore 136 in which the pump piston 137 reciprocates, the piston rod 138 extending above the casing of the pump and having a fixed connection with the arm 139 secured to the lower head 36 of one of the cylinders 37. The pump casing is also provided with an outlet passage 140 parallel to bore 136 and connected therewith at its lower end by the transverse bore 141. Communication between the bore 136 and the passage 140 is normally closed by the ball valve 142 yieldingly held upon its seat by spring 143.

It will be understood from the above that in each upward movement of the cylinder and piston assemblies associated with the indenting dies, the pump piston 137 is moved upwardly so that oil will be drawn by suction through the pipe 135 from the tank 131 into the bore 136. When the piston 137 moves downwardly in the indenting stroke of the dies 76, the inlet 133 is closed by the ball valve 144 and the pressure upon the oil in bore 136 moves valve 142 to open position so that the oil may flow upwardly through the passage 140 and into the pipe 145, the open end of which discharges the oil into the channel or trough 43 in the connecting member 42 between the upper cylinder heads 35. A sufficient level of oil is maintained in this channel so that the eccentric engaging rollers 47 will dip into the same and carry the oil upwardly to the eccentric portions 56 of the drive shaft 58 from which it is distributed longitudinally to the central shaft bearing 45 and to the shaft parts 57 engaged by the yokes connected with the member 42. A pipe 146 is connected at one of its ends with the overflow passage 147 communicating with one end of the channel 43 and has is discharge end positioned above the oil receiving cup 148 which returns the surplus oil from the channel 43 to the tank 131.

Preferably a pressure equalizing means is connected with a suitable type of gauge 149 mounted upon the front side of member 42, said equalizing means including the pipe connections 150 between said gauge and the upper ends of the cylinders 37.

I have provided a novel means for singly feeding the nuts to position beneath the vertically movable indenting dies and securely gripping and holding the individual nuts in accurate coaxial relation with said indenting members. This nut feeding and gripping means will now be described with particular reference to Figures 6 and 11 to 17, inclusive, of the drawings.

To the front end of the plate 41 and to each side edge thereof a bracket member 151 is adjustably fixed. Inwardly projecting stud shafts 152 are fixed in these brackets, and on each of said shafts a belt supporting roller 153 is journalled.

In spaced bearing brackets 154' fixed to the rear end of the plate 41 a transverse shaft 154 is journalled and upon this shaft the belt supporting wheels 155 are fixed and positioned in longitudinal alignment with the rollers 153. Endless flexible belts 156 are trained around the respective pairs of rollers 153 and 155 and are movable in suitable guide channels 157 formed in the upper and lower surfaces of the plate 41. To the outer surface of each belt a series of metal plates 158 arranged in longitudinally overlapping relation are hinged at one of their ends by any suitable means and are intended to receive and support the individual nuts manually released at suitable spaced intervals for gravity movement down the inclined chutes 160 suitably mounted upon the forward end of the plate 41 in alignment with the respective belts. Above the upper stretches of the belts and secured at their outer edges to plate 41 the nut guiding and retaining strips 161 are arranged. These strips assure that the nut will lie in a flat horizontal position on the respective feed belts as they approach the nut gripping means presently to be described.

Upon the rear end of the plate 41 and in line with the respective feed belts, stop plates 262 are adjustably mounted. Each of these plates has a longitudinal slot 263 which receives the spaced clamping bolts 264 threaded to plate 41 and whereby said stop plates may be secured in fixed position with their forward end edges disposed in predetermined relation to the path of movement of transversely movable nut gripping members, in accordance with the size of the nut to be indented.

Figure 2:
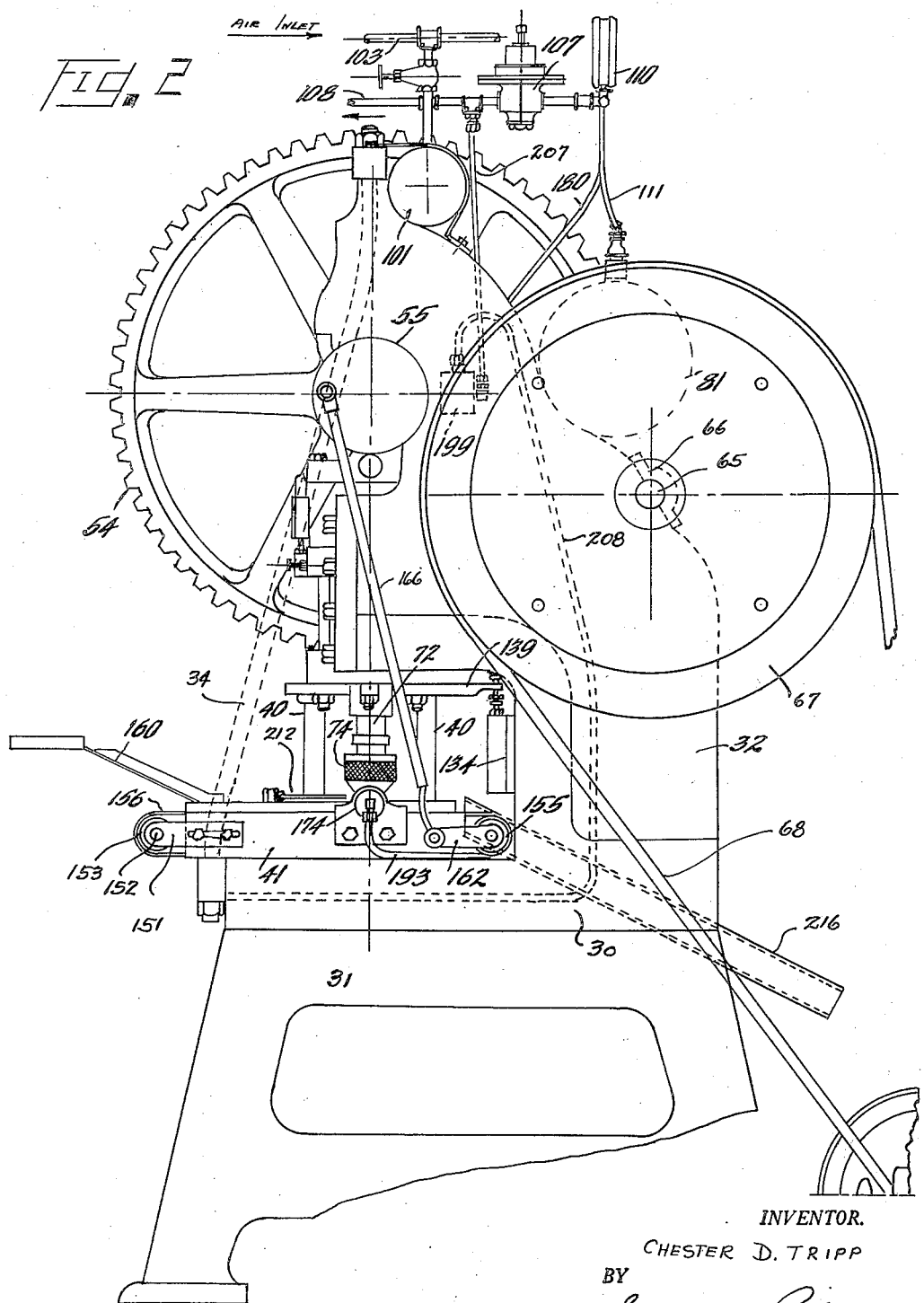
Figure 2 is an elevational view of the right hand side of the machine.

Any suitable means may be provided for imparting a step by step feeding movement to the belts 156. As herein shown a crank arm 162 is journalled by a suitable antifriction bearing 163 on one end of the shaft 154 and carries the spring pressed pawl 164 engaging the teeth of the ratchet 165 keyed or otherwise suitably fixed to said shaft, as clearly shown in Figures 11 and 12 of the drawings. As seen in Figure 2, the other end of the arm 162 is pivotally connected with the lower end of the pitman rod 166, the upper end of which is pivoted as at 167 to the outer side of the flange or disk 55 on the end of the drive shaft 50 adjacent to the periphery of said disk. This connection is so located with respect to the shaft eccentrics 56 that in the upward movement of the dies, the arm 162 is moved in a clockwise direction, whereby the pawl 164, coacting the ratchet 165 will rotate shaft 154 and move the nut feeding belts one step so that the rear or innermost nuts on said belts will be moved into abutting contact with the forward ends 262' of the stop plates 262 and in position to be engaged by the gripping means which will now be described.

Between the guide rods or posts 40 and at each side of a longitudinal vertical plane intersecting the axes thereof a nut gripping member 168 is rigidly fixed to the surface of the plate 41 by means of bolts or screws 169. These members are arranged in transverse alignment, and the outer ends thereof are provided with the notches 170 to receive one side of the nuts. As shown more particularly in Figure 14 of the drawings, in transverse alignment with the members 168 movable gripping members 171 are fixed to the inner ends of the piston rods 172 connected with pistons 173 in cylinders 174 which are suitably fixed to bracket members 175 bolted or otherwise secured to the opposite side edges of plate 41. The springs 176 in the cylinders 174 yieldingly resist inward movement of the pistons 173 and normally retain the gripping members 171 in outwardly spaced relation from the fixed gripping members 168.

Operation of the pistons 173 to move the members 171 inwardly to grip the nut between said members and the members 168 is properly controlled in timed relation to the movements of the nut feeding belts and the vertical reciprocation of the indenting dies by means of the valve mechanism illustrated in detail in Figures 16 and 16—A of the drawings. As shown in Figures 5 and 14 the valve casing 177 is suitably mounted on a fixed part 178 of the machine frame. This valve casing is of general rectangular form and has a chamber 179' which receives air through the pipe line 179 connected with the coupling between pipes 109 and 111. A valve member 180 in the chamber 179' has sliding contact with the side wall of said chamber opposite to the air inlet connection and is fixed to the upper end of a rod 181 which is movable through a suitable stuffing box 182 on the lower end wall of the valve casing. This rod is loosely engaged through an opening in the arm 183 fixed to the rear guide plate 39 connecting the lower cylinder heads 36 (Figure 4). A spring 184 on the rod 181 bears upwardly against the arm 183 and against the nut 185 threaded on the lower end of the rod and yieldingly urges the stop nut 186 on the rod 181 into contact with the upper side of the arm 183. Thus the spring 184 will yieldingly limit or cushion the downward movement of the valve 180 in the downward operating stroke of the die and piston assemblies As shown in Figure 16—A, the side of the valve member 180 having contact with the wall of the chamber 179' is provided with a recess or cavity 187 which, in one position of said valve, is adapted to connect the exhaust port 188 in the side wall with a port 189 extending upwardly through the top of the valve casing and with which the coupling head 190 is connected. This head is formed with an air receiving chamber 191 and outlet passages 192 leading therefrom to the pipe lines 193 coupled to the head 190 by suitable connections 194. The other ends of the pipe lines are respectively coupled by connections 195 with the outer ends of the respective piston cylinders 174.

Direct communication between the ports or passages 192 and the chamber 191 is normally closed by means of the ball valves 196 urged to their closed positions by means of the coil spring 197 positioned between said valves. However, chamber 191 is connected by relatively small diameter metering by-passes 198 with each of the pipe lines 193.

From the above description, it will be understood that air is supplied to the valve through the connection 179 and as the piston and die assembly moves downwardly, port 189 is uncovered by the valve 180 so that air is by-passed from the chamber 179' through the metering ports 198 around the valves 196 to their respective cylinders 174. The nuts having been fed by the belts 156 to position in alignment with the fixed gripping members 168, as above explained, the pistons 173 are thus actuated to move gripping members 171 inwardly against the action of the springs 176 to securely grip and hold the nuts between said members 171 and the opposing members 168 so that they are retained in accurate coaxial relation with the descending die members 76 during the indenting operation. In the ensuing upward movement of the dies and piston and cylinder assemblies, valve member 180 is moved over the port 189, thus connecting said port through the chamber or recess 187 with the exhaust port 188. The cylinders 174 will then be exhausted in the outward movement of pistons 173 under the action of the springs 176, the air passing therefrom through the passages 192 of relatively large diameter and unseating the valves 196 thus providing for a comparatively rapid unrestricted flow of the air from the chamber 191 through port 189 and recess 187 to the exhaust port 188.

Figure 6:
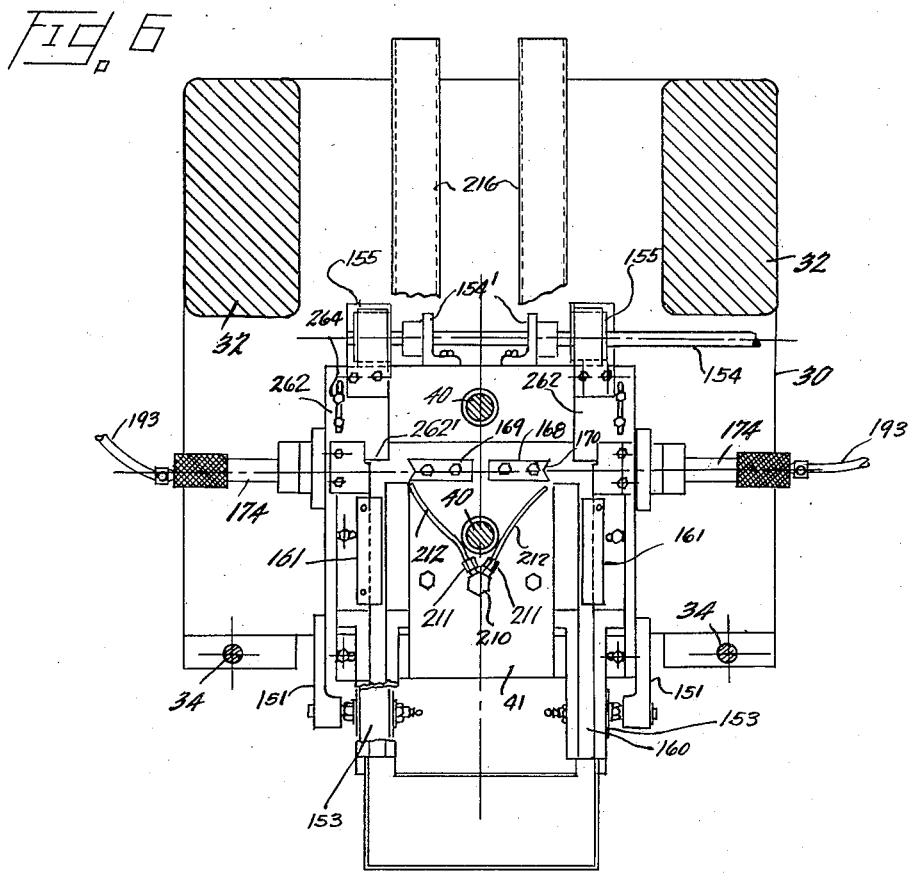
Figure 6 is a horizontal sectional view taken substantially on the line 6—6 of Figure 5.

I have also provided a simple and effective means for automatically discharging the finished indented nuts from the machine as shown more particularly in Figures 5, 6 and 17 of the drawings to which reference should now be had. At the rear side of the drive shaft 50 the valve housing 199 is suitably mounted upon a fixed part of the machine frame and is formed with an air inlet chamber 200 and an air outlet chamber 201. Communication between these chambers is normally closed by the valve 203 resiliently urged to its seat by the spring 204 bearing at one of its ends against one side of the valve housing 199 and at its other end against the collar 205 fixed to the outer end of the valve stem 206.

The inlet chamber 200 is connected by the pipe line 207 with the air inlet pipe 106 and the outlet chamber 201 of the valve housing is connected by the pipe line 208 with a horizontal passage or bore 209 in the plate 41 which opens upwardly through the top surface thereof. The outlet end of this passage is connected with a coupling member 210 threaded into the plate 41 and having angularly disposed branch outlets 211 overlying the upper surface of said plate. With each of these outlets a pipe or tube 212 is connected and extends rearwardly therefrom, said pipes or tubes being disposed at relatively opposite sides of the front guide rod or post 40 for the die and piston assembly.

The valve 203 is operated in timed relation with the operation of the indenting dies and nut gripping means by means of the detent member or stud 213 which is fixed to one of the parts 57 of the drive shaft 50 in predetermined relation to the eccentric portions 56 thereof circumferentially of the latter. This detent is adapted to contact with the pivoted lever 214 mounted on the end of an arm 215 on the valve housing 199 and engaged with the outer end of the valve stem 206. It will thus be understood that when the detent 213 strikes the pivoted lever 214, the valve 203 is forced to open position against the action of spring 204, thus admitting air from the chamber 200 to the outlet chamber 201 of the valve housing, from which it passes through the pipe line 208 and passage 209 to the distributing coupling 210 and pipes or tubes 212. The rear ends of these tubes are located closely adjacent to the outer ends of the fixed nut gripping members 168 so that after the nuts have been indented and released by the movable gripping members 171, air blasts will be directed by the pipes 212 against the nuts to eject or discharge the same rearwardly into the discharge chutes 216 shown in Figures 2 and 6 of the drawings in which they move downwardly by gravity and are deposited in suitable collection receptables at the rear side of the machine.

Having now described the several novel structural features of the invention, the functional operation of the machine will be understood as follows:

In the rotation of the drive shaft 50, and the upward movement of the piston and cylinder assemblies and dies 76, the nut feeding belts 156 are actuated, each of said belts feeding a single nut into position in transverse alignment with the fixed members 168. In the downward movement of the piston and die assemblies, prior to contact of the dies with the nuts, valve 180 is actuated in the manner above explained to admit high pressure air to the cylinders 174 and move the gripping members 171 inwardly to transversely displace the nuts from the respective conveyors, thus securely clamping and holding the nuts between said gripping members 171 and the fixed gripping members 168 in accurate coaxial alignment with the respective die members 76. After the die members have engaged and indented the nuts in the manner above explained, in the following upward movement of the die and piston assemblies, valve 180 moves upwardly to release the air pressure from cylinders 174 so that the gripping members 171 are moved outwardly to their releasing positions. Detent 213 now engages the lever 214 and moves the valve 203 to its open position, thus admitting high pressure air from pipe 106 to the tubes or pipes 212 which deliver high pressure air jets against the released finished nuts to direct the same rearwardly to the discharge chutes 216.

In the above operation, it will be observed that in the downward movement of the piston and die assemblies under the action of the eccentric portions 56 of the drive shaft, after the indenting members 76 contact the respective nuts, in the continued downward relative movement of the piston cylinders 37 the hydropneumatic means above described supplies a progressively increasing pressure to the pistons 71. The maximum pressure applied by the die members to the nuts may be accurately controlled and predetermined by proper adjustment of the pressure regulating valve 107 and the back pressure control valve 93. This maximum indenting pressure will be substantially the same, regardless of differences in the axial length or minor differences in density of the respective nuts so that the distorted thread portions 128 of the nut will have substantially identical locking characteristics. In Figures 25 and 26 I have shown a nut provided with three indentations. However, it will be apparent that if desired the indenting members 76 may be formed with any desired number of the indenting teeth so that a greater or less number of distorted thread sections may be formed at the end of the nut bore. The means which I provide for locating and securely holding or gripping the nuts together with the mechanical means for operating and guiding the unitary movement of the piston and cylinder and die assemblies under the action of the eccentrics 56 insures an accurately centered contact of the dies with the respective nuts. Since, thereafter, indenting pressure is applied to the dies solely by pressure fluid and independently of the mechanical operating means for the piston and die assemblies, the accurate formation of the indentations in the nut face to the desired depth with precisely the same thread distortion 128 at each indentation is obtained regardless of physical variations in different nuts or structural inaccuracies in the machine. Therefore, the locking action or pressure upon the threads of the complementary bolt or other member with which the nut is engaged will be substantially identical at each of the spaced points around the periphery thereof.

By such precise control of the initial and final indenting pressures the extent to which the helix angle of the spaced portions of the conventional nut thread is displaced or altered is definitely and accurately limited regardless of variation in axial length of the nuts. Thus the nut is provided with efficiently functioning self-locking characteristics, while it is also capable of repeated re-use without such mutilation of the bolt threads as would preclude the application of a standard nut to the same bolt.

It will also be appreciated that my present invention provides means for feeding the nuts to the machine and discharging the finished nuts therefrom which is operatively controlled by the drive shaft 50 in accurately timed relation with the vertical reciprocating motion of the piston and die assemblies. The nut feeding conveyors above described having the hinged metal plates 158 supporting the nuts provide smooth surfaces for sliding contact with the nuts after movement of the nuts is arrested by the stops 162. When these conveyor plates become unduly worn, they can be readily removed from the conveyor belt and new plates substituted therefor at nominal expense. It will be further noted that the machine organization as a whole comprises a minimum number of parts of comparatively simple structural form, mounted and arranged in a compact assembly upon a machine frame which will occupy a minimum of floor space.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine for converting standard nuts into lock nuts having uniform locking characteristics, a nut supporting member and a nut indenting die, a piston rigidly connected with one of said parts, a cylinder for said piston, means for supplying a fluid pressure medium to said cylinder, a driven shaft having an eccentric portion, a roller mounted on said cylinder, and yieldable yoke means connected with said cylinder loosely embracing the driven shaft to retain said roller in peripheral contact with the eccentric portion of said shaft and impart unitary reciprocation to said piston and cylinder.

2. The machine defined in claim 1, together with means connected with the cylinder and piston assembly and actuated in the reciprocation thereof to supply lubricant to said roller and eccentric.

3. In a machine for converting standard nuts into lock nuts having uniform locking characteristics, a device for releasably holding a nut, a cylinder and piston, power driven mechanism for reciprocating said cylinder and piston as a unit in coaxial relation with the nut, an indenting die carried by the piston and movable into contact with the nut in the unitary movement of the cylinder and piston in one direction, means for thereafter applying a progressively increasing resistance to movement of the piston with the cylinder in said direction to produce an effective indenting pressure of the die upon the nut, and mechanism automatically actuated in the unitary reciprocation of said cylinder and piston for controlling the operation of said nut holding device to nut holding and releasing position.

4. The machine defined in claim 3 together with additional means operatively controlled by said power driven mechanism for discharging the indented nuts from the machine.

5. The machine defined in claim 3, in which said nut holding device includes relatively movable parts, and said automatically operated mechanism comprises a fluid pressure operated motor connected with one of said parts, and means connected with and actuated by the cylinder and piston assembly, and operable in the reciprocation thereof, to control the effective operation of said motor.

6. In a machine for converting standard nuts into lock nuts having uniform locking characteristics, means for releasably holding a nut, a cylinder and piston, a power driven shaft, means for transmitting unitary reciprocating motion from said shaft to said cylinder and piston in coaxial relation with the nut, means for feeding nuts to said holding means, an indenting die carried by the piston and movable into contact with the nut in the unitary movement of the cylinder and piston in one direction, means for thereafter applying a progressively increasing resistance to movement of the piston with the cylinder in said direction to produce an effective indenting pressure by the die upon the nut, and actuating means for said nut feeding means operatively connected with said power driven shaft and actuated thereby to feed a nut to said holding means.

7. The machine defined in claim 6, in which said nut holding means includes relatively movable parts, together with means connected with and actuated by the cylinder and piston assembly to control the operation of said nut holding means to nut holding and releasing positions in timed relation with the actuation of said feeding means and the reciprocating movement of said cylinder and piston assembly.

8. In a nut indenting machine, a cylinder and piston assembly, an indenting die carried by the piston, power driven means operatively connected with said cylinder and piston assembly to reciprocate the same as a unit and contact the die with the nut, and hydro-pneumatic means for thereafter transmitting nut indenting pressure to the die through said piston, said means including a container for hydraulic medium connected with said cylinder, means for maintaining a predetermined air pressure within said container to establish an initial pressure of the hydraulic medium upon said piston, and means for variably regulating back pressure of the hydraulic medium through said cylinder connection to produce a predetermined progressively increasing nut indenting pressure of the hydraulic medium upon the piston after contact of the die with the nut in the movement of the cylinder relative to said piston.

9. In a nut indenting machine, a pair of cylinders and a piston in each cylinder having a rod, a nut indenting die carried by each piston rod, means for positioning and holding nuts to be engaged by the respective dies, connecting means between the piston rods to prevent relative angular movement thereof while permitting of their relative axial movement in accurately centered relation to the respective nuts, power driven means for reciprocating the cylinder and piston assemblies as a unit to contact the indenting dies with the respective nuts, and means for thereafter applying a progressively increasing resistance to relative movement between the pistons and the respective cylinders, to produce an effective indenting pressure by the dies upon the respective nuts.

10. The machine defined in claim 9, together with means for equalizing the pressure increase within said cylinders upon the respective pistons.

11. Nut feeding and positioning means for nut indenting machines comprising an endless nut conveyor, means adjacent one end of the conveyor to position a nut for engagement by an indenting die, including a nut gripping member movable transversely across the conveyor, operating means for the conveyor, and means for actuating said gripping member in timed relation with the conveyor operating means to engage a nut thereon and transversely displace the same from the conveyor for effective engagement by said nut positioning means.

12. The nut feeding and positioning means defined in claim 11, wherein an adjustable stop above the conveyor arrests movement of the nut with the conveyor to dispose the nut in alignment with said movable gripping member.

13. The nut feeding and positioning means defined in claim 11 wherein said conveyor includes a plurality of metal nut supporting plates in longitudinal succession and a stop member arrests movement of the nut with the conveyor plate and positions the same in alignment with said movable gripping member.

14. A machine for making lock nuts of uniform gripping and locking force from nuts of varying heights and density formed by quantity production methods, comprising a pair of members mounted for relative movement toward each other and operable to press a nut therebetween, one of said members being adapted to support a nut and the other comprising indenting means operable to indent a face of a supported nut and modify a portion of the nut threads in proportion to the depth and area of indentation, means for positioning a nut with respect to said indenting means, holding said nut during the indenting operation, and automatically releasing the indented nut upon separation of said indenting means and the nut, driving means for imparting a reciprocating movement to one of said members to bring said indenting means into pressing relationship with a supported nut, and pressure means having a predetermined minimum pressure and a predetermined maximum pressure and operable to independently control further relative movement between the indenting means and nut, whereby successive nuts will be subjected to identical pressing forces irrespective of variation in physical structure of different nuts or mechanical inaccuracies in the machine.

15. The combination defined in claim 14 together with air blast producing means operated in timed relation to said driving means for ejecting the completed nuts and moving them to a point of discharge.

16. The combination defined in claim 14 wherein said pressure means comprises a cylinder carried by one of said members, a piston operable in said cylinder and arranged to engage said nut indenting means with a nut, an inlet pressure line adapted to maintain predetermined minimum pressure in said cylinder between said piston and an end of said cylinder, and an outlet pressure valve connected to said line adapted to predetermine the maximum pressure attained on relative movement of said cylinder and said piston.

CHESTER D. TRIPP.

REFERENCES CITED

The following references are of record in the file of this patent:

UNITED STATES PATENTS

| Number | Name | Date |
| --- | --- | --- |
| 2,000,056 | Wilson | May 7, 1935 |
| 2,249,149 | MacMillin | July 15, 1941 |
| 2,266,923 | Williams | Dec. 23, 1941 |
| 2,352,668 | Tripp | July 4, 1944 |
| 2,385,390 | Tripp | Sept. 25, 1945 |
| 2,408,457 | Tripp | Oct. 1, 1946 |
| 2,438,951 | Stephens | Apr. 6, 1948 |

Certificate of Correction

Patent No. 2,536,110                                                  January 2, 1951

CHESTER D. TRIPP

It is hereby certified that error appears in the printed specification of the above numbered patent requiring correction as follows:

Column 1, line 46, for "varations" read *variations*; column 4, line 17, for the word "position" read *portion*; column 8, line 29, for "has is" read *has its*;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*